Sept. 11, 1962 R. F. RUTZ 3,054,070

OSCILLATORS OPERABLE SELECTIVELY BETWEEN OSCILLATION AND NON-OSCILLATION

Filed Dec. 30, 1960 3 Sheets-Sheet 1

INVENTOR
RICHARD F. RUTZ

BY Lester H. Clark
ATTORNEY

United States Patent Office 3,054,070

Patented Sept. 11, 1962

3,054,070

OSCILLATORS OPERABLE SELECTIVELY BETWEEN OSCILLATION AND NON-OSCILLATION

Richard F. Rutz, Fishkill, N.Y., assignor to International Business Machines Corporation, New York, N.Y., a corporation of New York Filed Dec. 30, 1960, Ser. No. 79,704
11 Claims. (Cl. 331—107)

Thus application is a continuation-in-part of my prior application for United States Letters Patent Serial No. 831,751, filed August 5, 1959, entitled "Oscillator Apparatus and Method of Making Same," and is also a continuation-in-part of my prior application Serial No. 846,421, filed October 14, 1959, entitled "Method and Apparatus for Performing Logic Operations."

This invention relates to oscillators and particularly to oscillators which are capable of remaining stably in either an oscillating or a non-oscillating state and which may be switched between those two stable states, for example, by means of input signals.

The oscillators described herein utilize Esaki diodes to produce oscillations, because of the known potential-current characteristics of such diodes, which characteristics include a portion of negative resistance at an intermediate range of potential and adjacent portions of positive resistance at higher and lower ranges of potentials. While the usual Esaki diode has only one negative resistance portion, diodes have been described having more than one negative resistance portion with intervening positive resistance portions.

When such a diode is supplied with direct current from a suitable source and is connected to an appropriate load, the circuit may be made to oscillate, as described in my copending application, Serial No. 831,751, mentioned above.

It has been observed that many Esaki diodes, depending upon the matrix materials and impurity materials used in their construction, having current potential characteristics with a negative resistance portion which joins an adjacent positive resistance portion in a gentle, sweeping curve, without any abrupt change in curvature near the meeting point of the two portions. The present invention is concerned with oscillators utilizing Esaki diodes having characteristics of the type just described. The adjoining, gently curved portions of the characteristic may occur either near the meeting point of the negative resistance portion and the low potential, positive resistance portion, or near the meeting point of the negative resistance portion and the high potential, positive resistance portion.

If an Esaki diode having a current-potential characteristic with such a gentle curve near the meeting point of the negative resistance portion and the high potential, positive resistance portion is connected to a source of direct current and a load, and if the applied potential of the source is increased gradually from zero, the diode at first has positive resistance and the circuit does not oscillate. As the applied potential increases, the diode moves into the negative resistance portion of its characteristic, and the circuit goes into oscillation. As the potential is further increased, the oscillation continues substantially through the negative resistance portion of the diode characteristic. At or near the end of that portion, at a particular potential at which the diode resistance is again positive, the oscillations cease. If the applied potential is now reduced slowly, then, as the diode moves into the negative resistance portion, oscillations begin again, but at a lower value of potential than the value at which the oscillations ceased.

An oscillator so constructed may thus be said to have an operating characteristic including different operating regions determined by the location of the operating point along the direct potential-current characteristic of the Esaki diode. The operating point may be defined as the intersection of the direct current load line with the direct potential-current characteristic of the Esaki diode, the two curves being taken independently. When the circuit is not oscillating, the measured current and potential coincide with the operating point as defined above. When the circuit is oscillating, the measured direct current and direct potential do not necessarily coincide with the operating point as described above. In the following discussion, the term "applied potential" refers to the potential which appears across the terminals of the Esaki diode and its parallel connected load. This potential is essentially the potential drop across the diode-load pair, due to current supplied from a constant current source.

The operating characteristic, as defined above, includes a self-oscillating region which is wholly within the negative resistance portion of the diode characteristic. This region of the oscillator operating characteristic is hereinafter referred to as the oscillating region. An adjacent region of the operating characteristic referred to as the selective oscillating region, typically lies at least partly within the negative resistance portion of the diode potential-current characteristic and extends into the positive resistance portion. When the operating point is within the selective oscillating region, the circuit may or may not oscillate, depending upon the immediate past history of the circuit as to applied potential. That region is hereinafter referred to as the selective oscillating region. There also exist further regions of the oscillator operating characteristic, typically entirely within the positive resistance portions of the diode potential-current characteristic, where the circuit does not oscillate. Those regions are hereinafter referred to as non-oscillating regions.

The oscillator may be shifted between its oscillating and non-oscillating conditions by the application of an input signal of limited duration, and, if the operating point is in the selective oscillating region, the oscillator will remain stably in the oscillating or non-oscillating condition, as determined by the input signal, after that signal has ceased.

For the purpose of improving the clarity of this specification, the various functional parts of the diode potential-current characteristics are referred to as "portions" of those characteristics, e.g., the negative resistance portion. On the other hand, the various functional parts of the oscillator operating characteristics are referred to as "regions," e.g., the selective oscillating region.

An object of the invention is to provide an improved oscillator which may be switched between oscillating and non-oscillating conditions.

Another object is to provide an improved oscillator of the type described, in which the potential and current supplied by the source of electrical energy may be the same in both the oscillating and non-oscillating conditions.

Another object is to provide an improved oscillator utilizing an Esaki diode as a negative resistance element.

Another object is to provide an oscillator using a first Esaki diode as a negative resistance element and a second Esaki diode having a different potential-current characteristic as a load on the first diode.

Another object is to provide means for switching such an oscillator between its oscillating and non-oscillating conditions.

Another object is to provide means for utilizing such an oscillator as a logic circuit, or as a memory device.

The foregoing and other objects of the invention are attained in the oscillators described herein. In those oscillators, an Esaki diode having a suitable potential-current characteristic is connected to a source of direct current and to a suitable load. The potential-current characteristic of the diode must have a negative resistance region which adjoins an adjacent positive resistance region at a locality where the radius of curvature of either or both of the positive and negative resistance portions of the characteristic is relatively large, as compared to the radius of curvature in another part of the negative resistance portion. Where the load on the Esaki diode is connected in parallel with the diode and driven by a constant current source, that load may be a simple resistor, athough such a resistor is relatively inefficient. In the preferred embodiment of the invention, the load is a second Esaki diode having a potential current characteristic sufficiently different from that of the first diode so that when the characteristic of the second diode is superimposed as a load line on the characteristic of the first diode, the characteristics intersect in a region of gentle curvature of the first diode characteristic, near the locality where the resistance of the first diode shifts from negative to positive.

In one modification of the invention described herein, the oscillating diode comprises a body of gallium arsenide, suitably doped and the load diode comprises a body of germanium, also suitably doped. This oscillator is suitable for operating at room temperatures by the application of input signals to shift it between its oscillating and non-oscillating conditions.

Another modification of the invention concerns an oscillator wherein the principal oscillating diode is germanium, suitably doped, and the load diode is indium antimonide, also suitably doped. Such an oscillator may be utilized at low temperatures, in the neighborhood of liquid nitrogen (77° K.). (The indium antimonide diode, unless extremely highly doped, loses its non-linear characteristics at some of the higher temperatures.)

Any of the oscillators described herein using Esaki diodes as loads, may be shifted into and out of oscillation by variations in their ambient temperature. Consequently, the oscillators may be utilized as thermostatic devices.

Arrangements are shown and described for utilizing oscillators constructed in accordance with the present invention either as logic circuits or as memory devices.

Other objects and advantages of the invention will become apparent from a consideration of the following specification and claims taken together with the accompanying drawings, in which:

FIG. 1

Figure 1:
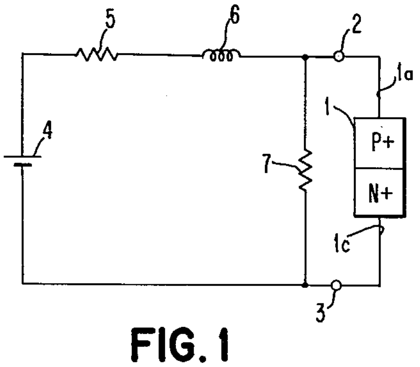
FIG. 1 is a wiring diagram of an oscillator embodying the invention.

This figure is a wiring diagram of an oscillator circuit embodying the present invention. The oscillator includes an Esaki diode 1 having an anode **1*a* connected to a terminal 2 and a cathode 1C connected to a terminal 3. A source of direct electrical energy, shown as a battery 4, a resistor 5 and an inductor 6 in series, is connected between the terminals 2 and 3. A load impedance, comprising a resistor 7, is also connected between the terminals 2 and 3**.

The circuit illustrated utilizes battery 4 and resistor 5 as a constant current source, with resistor 7 having a resistance less than the absolute value of the negative resistance of the Esaki diode.

Instead of having the resistor 7 in parallel with the diode, it may be placed in series with the diode (with the same limitation as to the resistance of resistor 7). In that event, the energy supply is not a constant current source, but rather a constant potential source. The last described circuit may be further modified, for extremely high frequencies, by adding a capacitor in parallel with the diode. The high frequency oscillating loop, in that modification, consists essentially of the diode and the capacitor.

FIG. 2

This figure corresponds to FIG. 1, but shows an equivalent circuit in place of the Esaki diode 1. Those elements in FIG. 2 which are the same as their counterparts in FIG. 1 have been given the same reference numerals, and will not be further described.

Figure 2:
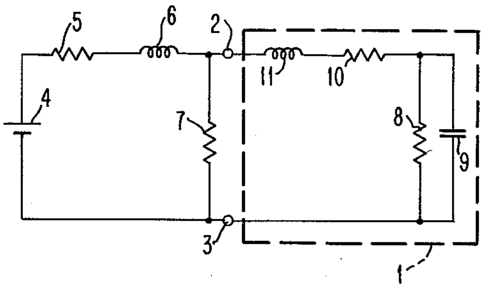
FIG. 2 is an equivalent circuit for the wiring diagram of FIG. 1, showing equivalent resistance, capacitance and inductance elements substituted for the Esaki diode in the circuit of FIG. 1.

In FIG. 2, the Esaki diode 1 is replaced by a resistor 8 and a capacitor 9 connected in parallel, with one of their common terminals connected to the terminal 3. The other common terminal of the resistor 8 and capacitor 9 is connected through a resistor 10 and an inductor 11 to the terminal 2. In the operation of an Esaki diode, resistor 8 is at times positive and at other times negative, while resistor 10 is always positive. The inductor 11 includes all the distributed inductance in the loop through diode 1 and resistor 7.

FIG. 3

This figure illustrates graphically a potential-current characteristic 12, which may be the potential-current characteristic of the diode 1 of FIG. 1, with three load lines 13, 14 and 15 superimposed upon it. These load lines represent essentially the impedance of the load resistor 7 (where resistor 5 is much larger than resistor 7, as in the usual case), and together with the characteristic 12 illustrate the operating characteristic of the oscillator of FIG. 1.

OPERATION OF FIG. 1

Figure 3:
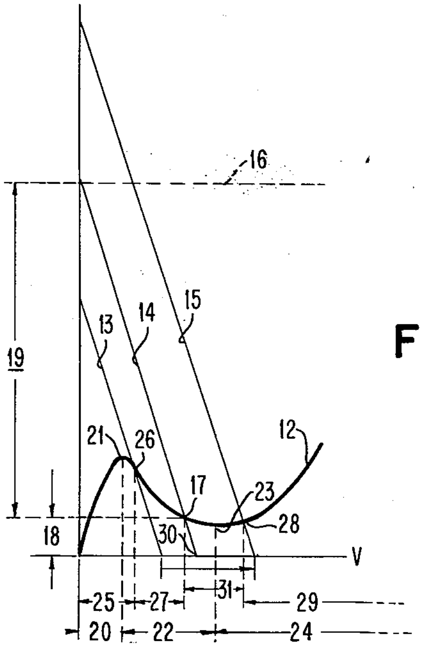
FIG. 3 is a graphical illustration of the potential-current characteristic for the diode in the oscillator of FIG. 1, and of the operating characteristic of that oscillator.

The characteristic 12 of FIG. 3 represents the direct current characteristic of the diode 1. In other words, the curve 12 shows the value of direct current which flows through the diode 1 for various values of applied potential.

The load lines 13, 14 and 15 represent the potential-current characteristics of the resistor 7. Note that the slope of the three load lines 13, 14 and 15 is the same indicating that the resistance value is the same. In accordance with the usual technique of applying load lines, these lines have been inverted from the orientation in which they would appear if they represented simple current-potential characteristics. Because of the inversion, their direction of slope may appear to indicate a negative resistance, although the resistance is always positive.

The battery 4 and resistor 5 operate as a constant current source, which may have a value such as that indicated by the horizontal dotted line 16 in FIG. 3. The current from that source flows through the resistor 7 and the diode 1 in parallel. At any particular point on the characteristic 12, the division of current from the source may be determined from FIG. 3. At the point 17, for example, the distance 18 between the zero axis and the point 17 is a measure of the current flowing through the diode. While the distance 19 between the point 17 and the line 16 is a measure of the current flowing through the resistor 7. All the foregoing statements refer to measurement of direct current quantities.

The characteristic 12, which is typical of Esaki diode current-potential characteristics has a positive resistance portion 20 between the origin and a positive peak at the point 21, a negative resistance portion 22 between the peak 21 and a valley point 23, and a second positive resistance portion 24 to the right of the valley point 23.

If a circuit is connected as shown in FIG. 1 and the potential of the battery 4 is increased gradually from zero, then the conditions in the loop of that circuit containing resistor 7 and diode 1 may be represented by a series of parallel load lines, of which the lines 13, 14 and 15 are typical. As to each load line, the slope of the line represents the resistance of resistor 7 and the potential at the intersection of the load line with the diode characteristic represents the potential across the terminals 2 and 3.

As the potential of the battery 4 is increased from zero, the characteristic 12 is initially in the positive resistance portion 20, and the circuit does not oscillate. This non-oscillating condition continues until after the circuit passes the peak 21. The operating characteristic of the oscillator may thus be said to include a non-oscillating region 25. At some point such as 26, whose locus is determined by the relative effects of the equivalent resistance 10, which is positive and of the equivalent resistance 8, which is then negative, the operating characteristics of the circuit change and the circuit passes into a region 27 hereinafter identified as the oscillating region. In other words, the circuit begins to oscillate after the applied potential increases beyond the value 25 corresponding to the point 26. The range of potentials corresponding to the oscillating region is indicated at 27.

When the circuit is oscillating, it does not remain at the operating point indicated by the intersection of the diode characteristic and the load line, but swings alternately to the right and left of that point. The swing to one side of the operating point may extend into a non-oscillating region. However, as long as the gain in the oscillating region is greater than the loss in the non-oscillating region, the circuit continues to oscillate.

As the applied potential continues to increase, the circuit continues to oscillate, even after the operating point has passed the point 17 corresponding to the upper potential limit of the region 27. The oscillations are damped out only when the applied potential reaches a value such as that indicated at 28, where the loss due to the positive resistance of the Esaki diode becomes greater than the gain due to negative resistance at the opposite ends of the swing of the oscillating circuit. After the potential 28 is reached, if the applied potential is increased further, the circuit will not oscillate. The region 29 to the right of the potential 28 is therefore a non-oscillating region.

If the applied potential is now decreased below the potential 28, the circuit does not start oscillating until the applied potential reaches some value such as that at 17 corresponding to the load line 14. At that point, the circuit will begin to oscillate again and it remains in oscillation until the operating point 26 is again reached.

The region between the potential 28 and the potential 17 is termed the selective oscillating region 31. In that region, the condition of oscillation or non-oscillation of the circuit depends upon the immediate past history of the applied potential. If the applied potential has been in the region 27, then the circuit continues to oscillate as the applied potential moves through the region 31. However, if the applied potential has been in the region 29, then the circuit remains non-oscillating as the applied potential moves through the region 31.

While it is considered that these three regions, namely the non-oscillating region 29, the selective oscillating region 31, and the oscillating region 27 exist for substantially all Esaki diodes, the selective oscillating region 31 may be very narrow and difficult to locate unless the diode has a characteristic such as that shown at 12 in FIG. 3, including a gently curved portion adjacent the meeting point 23 of the negative resistance portion 22 and the positive resistance portion 24. As explained below in connection with FIG. 7, a similar set of oscillating, selective oscillating and non-oscillating regions may be secured in the neighborhood of the peak 21 if the characteristic has a gentle curvature at that locality.

It has been determined by small signal analysis, that in order to self-start oscillation of a circuit of the type described, the following equation must be satisfied:

$$\frac{L}{R_t} \geqq R_n C$$

where L is the total inductance in the diode-load loop (inductor 11, representing distributed inductance), $R_t$ is the total positive resistance in the circuit (7+10), $R_n$ is the negative resistance at the operating point (resistor 8), and C is the capacitance of capacitor 9.

Once oscillation is started by operating of the circuit at a particular applied potential at which the above equation is satisfied, then the applied potential may be shifted, but the oscillation will continue as long as the gain in the negative resistance part of the oscillation cycle is equal to or greater than the loss in any positive resistance part of the cycle which may exist.

The oscillation may be either substantially square wave or sinusoidal, or it may have some wave from between those two limits.

FIG. 4

Figure 4:
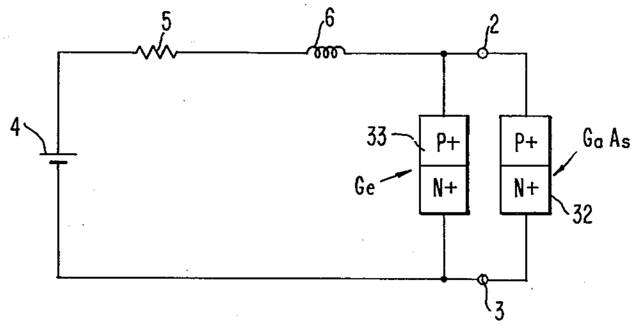
FIG. 4 is a wiring diagram of a modified form of oscillator embodying the invention.

In the circuit of FIG. 1, some of the current values are very high. The circuit is consequently inefficient due to the resistance losses in the resistor 7 and in other parts of the circuit. A modification which avoids these high resistance losses is illustrated in FIG. 4. In this circuit, those elements having the same structure and function as their counterparts in FIG. 1 have been given the same reference numerals and will not be further described.

In FIG. 4, the Esaki diode 1 of FIG. 1 has been replaced by an Esaki diode 32, which may be of gallium arsenide, suitably doped. The load resistor 7 of FIG. 1 is replaced by another Esaki diode 33, which may be of germanium, suitable doped.

Figure 5:
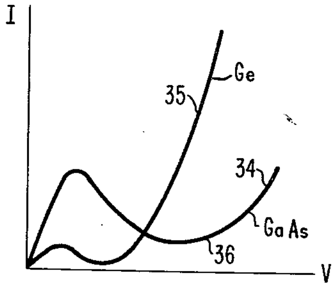
FIG. 5 illustrates the potential-current characteristics of the two diodes employed in the circuit of FIG. 4.

FIG. 5 illustrates the potential-current characteristics of the diodes 32 and 33. The curve 34 represents the potential-current characteristic of the diode 32, while the curve 35 represents the potential-current characteristics of the diode 33. Note that it is desirable that the two characteristics be substantially different and that the difference be such that the characteristics intersect in the general neighborhood of the valley point 36 on one of the diodes.

Figure 6:
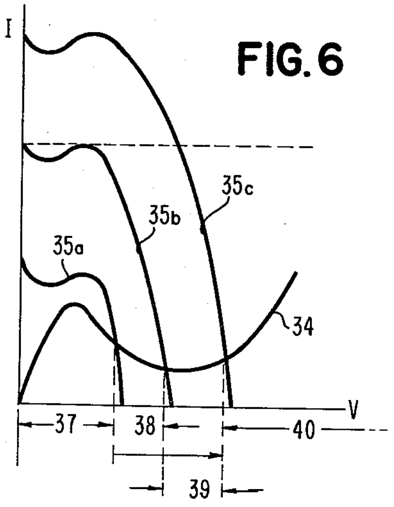
FIG. 6 is a graphical illustration similar to FIG. 3, illustrating the operating characteristic of the oscillator of FIG. 4.

FIG. 6 illustrates the characteristic 34 of FIG. 5 with three curves 35*a*, 35*b* and 35*c*, superimposed on it as load lines derived from the characteristic 35, for various applied potentials.

As the applied potential is increased from zero in FIG. 6, the circuit passes successively through a non-oscillating region 37, an oscillating region 38, and a selective oscillating region 39, and finally enters a non-oscillating region 40. The regions 37, 38, 39 and 40 in FIG. 6 correspond to the regions 25, 27, 31 and 29 of FIG. 3.

The characteristics in FIG. 5 are taken at room temperature, hence the circuit of FIG. 4 is suitable and may be shifted between its oscillating and non-oscillating conditions in that general range of temperatures.

The gallium arsenide diode 32 may include a P region doped with zinc in a concentration of about $10^{19}$ acceptor atoms per cubic centimeter, and an N region doped with tellurium in a concentration of about $10^{19}$ donor atoms per cubic centimeter.

The germanium diode 33 may include a P region doped with gallium in a concentration of about $5\times10^{19}$ acceptor atoms per cubic centimeter and an N region doped with arsenic in a concentration of about $5\times10^{19}$ donor atoms per cubic centimeter.

FIGS. 7 AND 8

Figure 7:
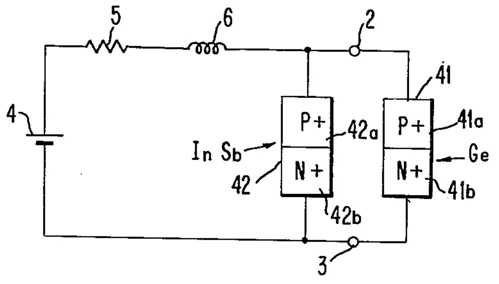
FIG. 7 is a wiring diagram illustrating still another oscillator embodying the invention.

FIG. 7 is a wiring diagram showing an oscillator constructed in accordance with the invention and adapted for operation at low temperatures (e.g., 77° K.)

In the circuit of FIG. 7, the diode 1 of FIG. 1 is replaced by a diode 41 of germanium including a P region **41*a* doped with gallium in a concentration of about $10^{20}$ net acceptor atoms per cubic centimeter and an N region 41*b* doped with arsenic in a concentration of about $3\times10^{19}$ net donor atoms per cubic centimeter. Resistor 7 of FIG. 1 is replaced by a diode 42 of indium antimonide including a P region 42*a* doped with cadmium in a concentration of about $5\times10^{17}$ net acceptor atoms per cubic centimeter and an N region 42*b*** doped with tellurium in a concentration of about $5\times10^{17}$ net donor atoms per cubic centimeter.

Figure 8:
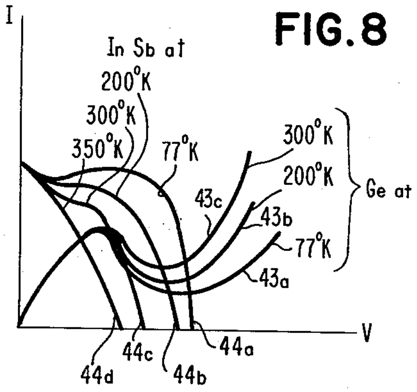
FIG. 8 is a graphical illustration of the operating characteristics of the oscillator of FIG. 7 at different temperatures.

FIG. 8 shows a series of three potential-current characteristics **43*a*, 43*b* and 43*c* taken for the diode 41 at three temperatures which may be 77° K., 200° K., 300° K. A series of load lines 44*a*, 44*b*, and 44*c* and 44*d* are derived from current-potential characteristics of the diode 42, taken at four different temperatures, which may be 77° K., 200° K., 300° K., 350° K. Note that the two load lines 44*a* and 44*b* intersect the two characteristics 43*a* and 43*b* for corresponding temperatures in the gently curved regions of those characteristics and hence the diodes shown and described may be used to produce oscillators operable at those temperatures. At temperature 300° K., the intersection between the characteristic 44*c* and 43*c*** is well out of the gently curved region. While the circuit of FIG. 7 may oscillate at 300° K., it might be extremely difficult, if not impossible, to locate the selective oscillating region.

Note that the characteristics **43*a*, 43*b* and 43*c* join at the left of their positive peak, and that the load line 44*d*** for 350° K. has lost most of its non-linear qualities and is almost a straight line. Consequently, for the constant current input indicated, the circuit would definitely not oscillate at 350° K., which is in the room temperature range. The circuit of FIG. 4 may be used as a thermostat to detect changes in temperature. Below a certain temperature, determined by the characteristics of the materials used in the two diodes, the circuit may oscillate. Above that temperature, oscillation will not occur. Consequently, the circuit may be used to detect changes in temperature above and below that level. In fact, any of the circuits illustrated herein using Esaki diodes as loads may similarly be used to detect some particular temperature level, since all Esaki diodes lose the negative resistance portions of their characteristic at some temperature.

FIG. 9

This figure illustrates specific characteristics which were observed in an oscillator constructed as illustrated above in connection with FIGS. 7 and 8. The curve 66 is in the current-potential characteristic of a germanium diode such as diode 41. The curve 67 is the potential-current characteristic of an indium antimonide diode such as diode 42. As the applied potential was increased from zero, oscillations were observed in the oscillating region 68, beginning just above 0.2 volts and continuing through the selective oscillating region 69, terminating about 0.425 volts. No oscillations were observed in the non-oscillating region 70 at higher potentials. As the applied potential was again reduced, no oscillations were observed in the selective oscillating region 69, but began again in the oscillating region 68. The current flows observed during oscillation are indicated by the curve 71. The currents indicated by curve 71 are slightly higher than might be predicted from direct calculation from curves 66 and 67. This difference is due to the fact that curves 66 and 67 were taken with direct current, while curve 71 was taken with oscillating current.

FIG. 10

Figure 10:
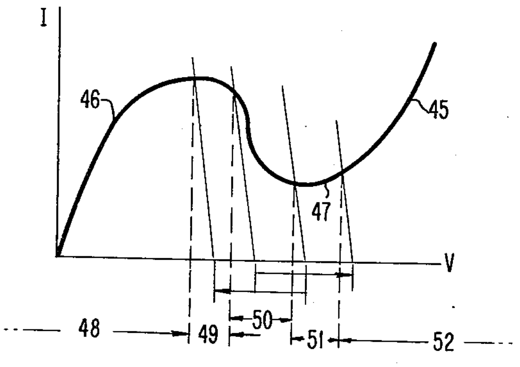
FIG. 10 is a graphical illustration of: (1) the potential-current characteristic of another type of Esaki diode which may be utilized in an oscillator embodying the present invention, and (2) the operating characteristic of such an oscillator.

FIG. 10 illustrates the potential-current characteristic 45 of an Esaki diode which may be connected into an oscillator circuit of the type described above. When so connected, this diode will produce an oscillator having as the applied potential is increased, a low potential non-oscillating region 48 followed by a low potential selective oscillating region 49, then an oscillating region 50 followed by a high potential selective oscillating region 51 and finally a high potential non-oscillating region 52. Note that the characteristic 45 has generally smooth curves both at the peak 46 and at the valley point 47. Regardless of the specific load connected to an oscillator diode having the characteristic 45, the oscillator will have operating characteristics including the five regions described above.

A diode having a current-potential characteristic such as that shown at 45 may be produced by using a germanium matrix and doping it with gallium to form a P region having a concentration of about $5\times10^{20}$ net acceptor atoms per cubic centimeter. The N region may be doped with arsenic with a concentration of about $3\times10^{19}$ net donor atoms per cubic centimeter.

FIG. 11

Figure 11:
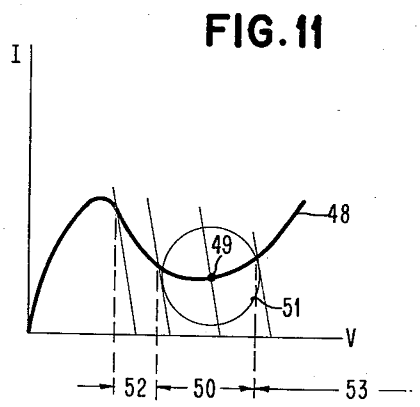
FIG. 11 is a graphical illustration of the operating of oscillators embodying the present invention, by means of input pulses.
Figure 9:
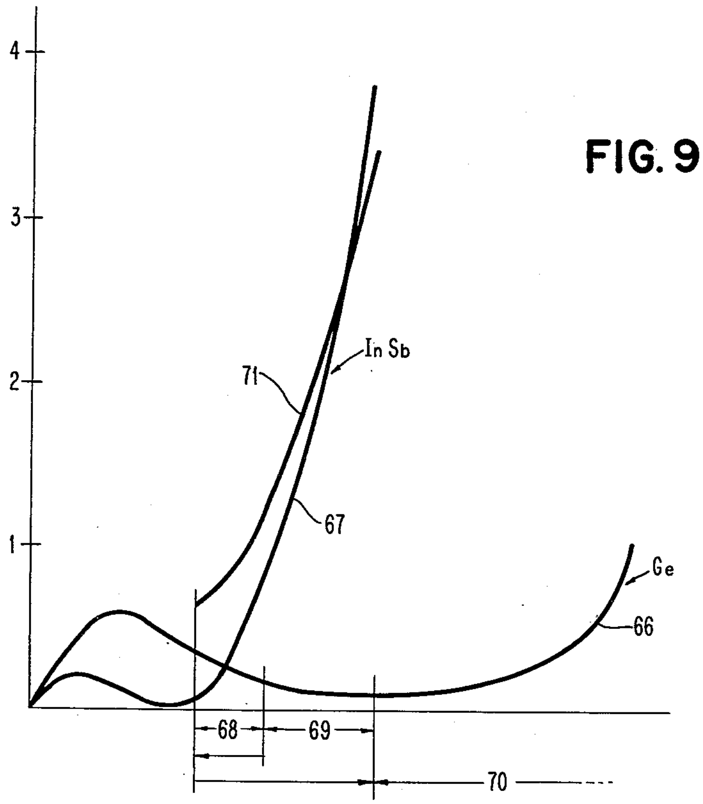
FIG. 9 is a graphical illustration of the diode potential-current characteristics and oscillator operating characteristic actually encountered in a specific circuit constructed in accordance with FIG. 7.

This figure illustrates graphically a method of switching the oscillators described above between their selective oscillating regions and their oscillating and non-oscillating regions. In FIG. 11, 48 represents the characteristic of the Esaki diode and 49 represents an operating point at about the center of the selective oscillating region 50. The oscillator may be switched to an oscillating condition by a pulse, which may be either a current or potential pulse, which carries the diode outside of a circle of stability indicated at 51. An input pulse outside that circle tends to start oscillation after the pulse terminates, even though the pulse is in a direction away from the oscillating region 52. This is especially true if the pulse terminates sharply. In other words, if the oscillator receives a potential pulse signal sufficient to carry it outside of the circle of stability 51 and into the non-oscillating region 53, oscillations will cease for the duration of the pulse. After the pulse terminates, however, the circuit may swing back through the selective oscillating region 50 and overshoot into the oscillating region 52, because of the capacitive and inductive elements in the circuit. If the last swing of the overshoot is into the region 52, then the circuit will remain in oscillation. However, if the input pulse is in the proper direction to swing the circuit into the non-oscillating region 53 and the pulse decays slowly so as to forcibly restrain the circuit against overshoot tendencies, then the circuit remains non-oscillating after it comes back to the operating condition indicated at the intersection 49.

FIG. 12

This circuit is similar to the circuit of FIG. 7, with a choke coil 54 added to keep oscillations out of the current supply. Two signal inputs are provided. One input includes a pair of input terminals 55 and 56. Input terminal 56 is grounded. Input terminal 55 is connected through a diode 57 and a capacitor 58 to the terminal 2 of the oscillator. The other input includes terminals 59 and 60. Input terminal 60 is grounded. Input terminal 59 is connected through a diode 61 and capacitor 62 to the oscillator terminal 2. Oscillating terminal 2 is also connected through a capacitor 63 to an output terminal 64 whose output terminal 65 is grounded.

Figure 12:
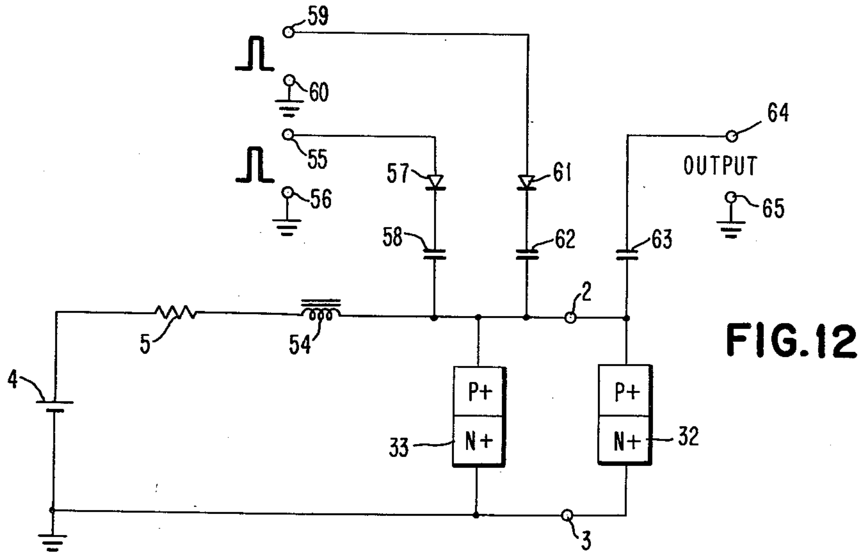
FIG. 12 is a wiring diagram of a logic circuit embodying the present invention.

The circuit of FIG. 12 may be operated as a logic circuit, specifically an AND circuit. When so operated, each of the signals supplied to the two inputs is insufficient to carry the circuits from the operating point 59 outside the circuit of stability 51, and are hence insufficient to change the oscillating condition of the circuit. However, if both inputs occur simultaneously, the circle of stability is exceeded and the circuit is switched, typically from a non-oscillating condition to an oscillating condition. The input pulses must have a duration at least of the order of one cycle of the oscillation frequency. The duration required depends also on the amplitude of the input pulses. The greater the amplitude, the shorter the duration required, as long as the minimum mentioned above is met.

After the circuit has once been set in this oscillating condition, it acts as a memory device and remains in oscillation. The memory may be read out by connecting a suitable output between terminals 64 and 65. The output must be of sufficiently high impedance so that it does not damp the oscillator back into a non-oscillating condition. A suitable reset input may be provided with a slow decaying reset signal to restore the circuit to its non-oscillating condition.

When used with a single input of sufficient magnitude to exceed the circle of stability, the circuit operates as a memory device, without the logic function. Such memory devices may be connected in a memory matrix, as is conventional with memory devices.

Instead of the capacitive coupling indicated for the pulse sources 55, 56 and 59, 60, each of those sources could be replaced by a constant current pulse source including a battery, a resistor and a choke in series with suitable switching means. As another alternative, the input pulses could be transformer coupled across the terminals 2 and 3.

While I have shown and described certain preferred embodiments of my invention, other modifications thereof will readily occur to those skilled in the art, and I therefore intend my invention to be limited only by the appended claims.

What is claimed is:

1. An oscillator comprising an Esaki diode having an anode and a cathode, a load impedance having its respective terminals connected to the anode and cathode of the diode, a source of direct current having its respective terminals connected to the anode and cathode of the diode, said diode having a potential-current characteristic including a negative resistance portion and an adjoining positive resistance portion, said portions being substantially free of sharp changes in curvature near their meetting point, said oscillator having an operating characteristic including a selective oscillating region corresponding to a part of the diode characteristic including a first part of the negative resistance portion adjacent said meeting point, a self-oscillating region corresponding to a second part of the negative resistance portion of the diode characteristic farther from the meeting point than said first part, and a non-oscillating region corresponding to a part of the positive resistance portion of the diode characteristic, said source having a potential tending to establish the oscillator in the selective oscillating region, and means for varying an operating condition of the oscillator to shift it from said selective oscillating region either to the self-oscillating region to initiate oscillation or to the non-oscillating region to terminate oscillation.

2. An oscillator as defined in claim 1, in which said load impedance is a resistor having a load line whose intersection with said diode characteristic, as determined by the potential of said source, lies within the selective oscillating region of the oscillator operating characteristic.

3. An oscillator as defined in claim 1, in which said load impedance is a second Esaki diode having a load line whose intersection with the potential current characteristic of the first diode, as determined by the potential of said source, is within the selective oscillating region of the oscillator operating characteristic.

4. An oscillator as defined in claim 3, in which said first diode is formed from a semiconductive body of gallium arsenide and the second diode is formed from a second conductive body of germanium.

5. An oscillator as defined in claim 3, in which said first mentioned diode is formed from a semiconductive body of germanium and the second diode is formed from a semiconductive body of indium antimonide.

6. An oscillator as defined in claim 1, in which said means for varying an operating condition of the oscillator comprises means for supplying signal pulses of limited duration, said oscillator being effective upon return of said selective oscillating region to retain the oscillating or non-oscillating state determined by the last signal pulse.

7. An oscillator as defined in claim 6, in which said signal pulses decay slowly so as to prevent overshoot of the oscillator beyond the selective oscillating region.

8. An oscillator as defined in claim 1, in which the Esaki diode potential-current characteristic has a low potential positive resistance portion, an intermediate potential negative resistance portion, and a high potential positive resistance region, and said meeting point is between said high potential positive resistance portion and said negative resistance portion.

9. An oscillator as defined in claim 8, in which the diode is formed of gallium arsenide and includes a P region doped with zinc in a concentration of about $10^{19}$ acceptor atoms per cubic centimeter and an N region doped with tellurium in a concentration of about $10^{19}$ donor atoms per cubic centimeter.

10. An oscillator as defined in claim 1, in which said diode has a potential-current characteristic having a low potential positive resistance portion and a higher potential negative resistance portion, and said meeting point is between said portions.

11. An oscillator as defined in claim 10, in which said diode is formed from germanium and includes a P region doped with gallium in a concentration of $5 \times 10^{20}$ net acceptor atoms per cubic centimeter and an N region doped with arsenic in a concentration of $3 \times 10^{19}$ net donor atoms per cubic centimeter.

No references cited.